United States Patent
Sundaram

(10) Patent No.: US 9,125,162 B2
(45) Date of Patent: Sep. 1, 2015

(54) POWER LEVEL ADJUSTMENT OF RADIO SIGNALS IN WIRELESS DEVICES

(71) Applicant: FUJITSU LIMITED, Kawasaki-shi, Kanagawa (JP)

(72) Inventor: Rajesh Sundaram, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 13/940,111

(22) Filed: Jul. 11, 2013

(65) Prior Publication Data

US 2015/0017935 A1 Jan. 15, 2015

(51) Int. Cl.
*H04B 7/00* (2006.01)
*H04W 52/28* (2009.01)
*H04W 52/36* (2009.01)

(52) U.S. Cl.
CPC .......... *H04W 52/283* (2013.01); *H04W 52/367* (2013.01)

(58) Field of Classification Search
CPC ...... H04B 1/3838; H04B 5/00; H04W 52/283
USPC .......... 455/41.1, 41.2, 522, 66.1, 67.11, 67.7, 455/68, 127.1
See application file for complete search history.

(56) References Cited

U.S. PATENT DOCUMENTS 8,674,900 B2 * 3/2014 Park .............................. 345/1.1
2009/0305742 A1 * 12/2009 Caballero et al. ............. 455/566

OTHER PUBLICATIONS

AZD058 Tablet Computer Proximity Sensors—Application Note, Version 1.0, Feb. 9, 2012.
"SAR for laptop and tablets", Federal Communications Commission Office of Engineering and Technology Laboratory Division Public Draft Review, May 20, 2013.
Integrating Motion and Orientation Sensors, Sep. 28, 2012.

* cited by examiner

*Primary Examiner* — Tuan Pham
(74) *Attorney, Agent, or Firm* — Maschoff Brennan

(57) ABSTRACT

A wireless device may include a first detection unit configured to detect movement of the wireless device. The wireless device may also include a controller configured to determine whether a user is holding the wireless device based on the movement of the wireless device detected by the first detection unit. The controller may also be configured to generate a power adjust signal based on a determination that the user is holding the wireless device. The wireless device may also include a wireless radio controller configured to adjust a power level of a radio signal broadcast by the wireless device based on the power adjust signal.

12 Claims, 5 Drawing Sheets

POWER LEVEL ADJUSTMENT OF RADIO SIGNALS IN WIRELESS DEVICES

FIELD

The embodiments discussed herein are related to adjusting power levels of radio signals in wireless devices.

BACKGROUND

Many wireless devices have one or more antennas that may operate simultaneously within the same frequency band or in different frequency bands. Common examples of such wireless devices include portable communications products such as cellular handsets, personal digital assistants (PDAs), tablets, laptops, among other wireless devices.

When operating, these wireless devices broadcast radio signals to enable the wireless devices to wirelessly communicate with access points, such as cellular towers, wireless routers, and other devices. The radio signals may be absorbed by a user of the wireless device among other objects surrounding the wireless device.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a wireless device may include a first detection unit configured to detect movement of the wireless device. The wireless device may also include a controller configured to determine whether a user is holding the wireless device based on the movement of the wireless device detected by the first detection unit. The controller may also be configured to generate a power adjust signal based on a determination that the user is holding the wireless device. The wireless device may also include a wireless radio controller configured to adjust a power level of a radio signal broadcast by the wireless device based on the power adjust signal.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to an aspect of an embodiment, a wireless device is described that is configured to adjust a power level of radio signals broadcast by the wireless device when the wireless device determines that a user is holding the wireless device. The wireless device may determine that a user is holding the wireless device using one or more detection units (e.g., sensors) in the wireless device. For example, in some embodiments, the wireless device may use a proximity sensor and an accelerometer to determine that the wireless device is being held by a user.

Reducing a power level of radio signals emitted by a wireless device when a user is holding the wireless device may allow the wireless device to reduce the amount of radio signals that may be absorbed by the user of the wireless device. Furthermore, reducing the power level of radio signals emitted by the wireless device when the user is holding the wireless device may increase the ability of the wireless device to comply with certain standards or regulations, such as specific absorption rate (SAR) compliance standards mandated by the Federal Communications Commission (FCC) of the United States and other global regulatory agencies.

Embodiments of the present invention will be explained with reference to the accompanying drawings.

Figure 1:
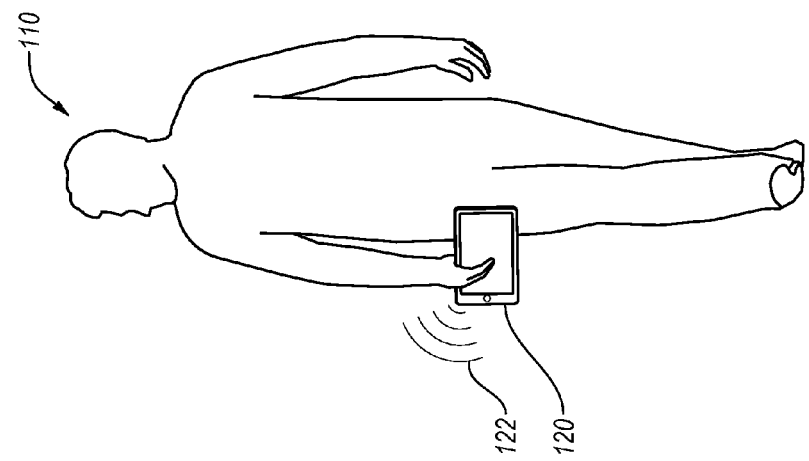
FIG. 1 illustrates an example user of an example wireless communications system.
Figure 1:
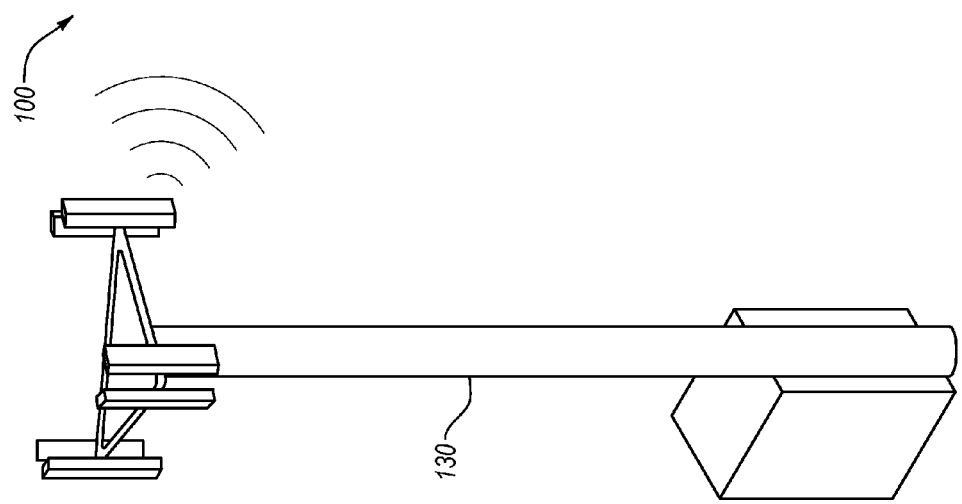

FIG. 1 illustrates an example user 110 of an example wireless communications system 100, arranged in accordance with at least one embodiment described herein. The wireless communications system 100 ("the system 100") may be configured to provide wireless communication services to a wireless device 120 via one or more access points 130. Although not expressly illustrated in FIG. 1, the system 100 may include any number of access points 130 providing wireless communication services to the wireless device 120.

The wireless communication services provided by the system 100 may include voice services, data services, messaging services, and/or any suitable combination thereof. The system 100 may include a Time Division Duplexing (TDD) network, a Frequency Division Duplexing (FDD) network, a Frequency Division Multiple Access (FDMA) network, an Orthogonal FDMA (OFDMA) network, a Code Division Multiple Access (CDMA) network, a Time Division Multiple Access (TDMA) network, a Direct Sequence Spread Spectrum (DSSS) network, a Frequency Hopping Spread Spectrum (FHSS) network, and/or some other wireless communication network. In some embodiments, the system 100 may be configured to operate as a second generation (2G) wireless communication network, a third generation (3G) wireless communication network, a fourth generation (4G) wireless communication network, and/or a Wi-Fi network. In these or other embodiments, the system 100 may be configured to operate as a Long Term Evolution (LTE) wireless communication network. Alternately or additionally, the system 100 may include a Bluetooth network, a Wireless Fidelity (Wi-Fi) network, a wireless local area network (WLAN) network, an IEEE 802.11 network, or any other wireless communication network.

The access point 130 may be any suitable wireless network communication point that may provide wireless communication services to the wireless device 120. The access point 130 may include, by way of example but not limitation, a base station, a remote radio head (RRH), a Node B, an evolved Node B (eNB), a wireless router, a wireless terminal, a Bluetooth port, or any other suitable communication point.

The wireless device 120 may be any device that may use the system 100 for obtaining wireless communication services and may also be referred to as a mobile station, an access terminal, user equipment (UE), a wireless communication device, a cellular phone, or some other terminology. For example, a wireless device 120 may include, by way of example and not limitation, a cellular phone, a smartphone, a personal data assistant (PDA), a laptop computer, a tablet computer, a wireless communication card, or any other similar device configured to communicate within the system 100.

While using the wireless communication services provided by the system 100, the wireless device 120 may transmit radio signals 122 to the access point 130. The wireless device 120 may further be configured to determine when the user 110 is holding the wireless device 120 and to adjust the power level of the radio signals 122 when it is determined that the user 110 is holding the wireless device 120. In particular, the wireless device 120 may reduce the power level of the radio signals 122 being transmitted to the access point 130 when the user 110 is holding the wireless device 120. FIG. 1 illustrates the user 110 holding the wireless device 120.

In some embodiments, the wireless device 120 may adjust the power level of the radio signals 122 as soon as the wireless device 120 determines that the user 110 is holding the wireless device 120. Alternately or additionally, the wireless device 120 may wait for a period of time before adjusting the power level of the radio signals 122. For example, the wireless device 120 may determine that the user 110 is holding the wireless device 120 and the wireless device 120 may adjust the power level of the radio signals 122 after the user 110 has held the wireless device 120 for the period of time.

In some embodiments, the wireless device 120 may be considered to be held by the user 110 when the user 110 is completely or partially supporting the wireless device 120. For example, in some embodiments, the user 110 may be holding the wireless device 120 when the user 110 is holding the wireless device 120 with the hands of the user 110 (as illustrated in FIG. 1) or the wireless device 120 is resting on the lap, arm, or some other portion of the user 110. When the user 110 is holding the wireless device 120, the user 110 may or may not be interacting with the wireless device. In these and other embodiments, the power level of the radio signals 122 may be reduced when the user 110 is holding the wireless device 120 and interacting with the wireless device 120 to cause the wireless device 120 to communicate with the access point 130 through broadcasting the radio signals 122. Alternately or additionally, when the user 110 is not interacting with the wireless device 120 and the wireless device 120 is communicating with the access point 130 through broadcasting the radio signals 122, the power level of the radio signals 122 may be reduced when the user 110 is holding the wireless device 120.

Furthermore, the user 110 interacting with the wireless device 120 may not indicate that the wireless device 120 is being held by the user 110. For example, the wireless device 120 may be a tablet. The wireless device 120 may be resting on a table and the user 110 may be interacting with a screen of the wireless device 120. In these and other embodiments, the wireless device 120 may not be considered to be held by the user 110.

In some embodiments, the wireless device 120 may adjust the power level of the radio signals 122 when the wireless device 120 determines that the user 110 is holding the wireless device 120 in a particular manner. For example, the wireless device 120 may adjust the power level of the radio signals 122 when the wireless device 120 determines that the user 110 is holding the wireless device 120 such that a portion of the user 110 is proximate to an antenna in the wireless device 120 that transmits the radio signals 122. In some embodiments, the user 110 may be proximate to an antenna in the wireless device 120 when the user is within 0.5, 1, 2, 3, or more or less inches of the antenna of the wireless device 120. In these and other embodiments, the wireless device 120 may not adjust the power level of the radio signals 122 when the wireless device 120 determines that the user 110 is holding the wireless device 120 but not in the particular manner.

In some embodiments, the wireless device 120 may be configured to maintain the power level of the radio signals 122 at the adjusted power level while the wireless device 120 determines that the user 110 is holding the wireless device. After the wireless device 120 determines that the user 110 is not holding the wireless device 120, the wireless device 120 may further adjust the power levels of the radio signals 122. For example, the wireless device 120 may reduce the power levels of the radio signals 122 when the user 110 is holding the wireless device 120. After it is determined that the user 110 has stopped holding the wireless device 120, the wireless device 120 may increase the power levels of the radio signals 122.

In some embodiments, the wireless communication services provided by the system 100 may suggest a power level for the radio signals 122. In these and other embodiments, the wireless device 120 may adjust the power levels of the radio signals 122 below or above the power levels suggested by the wireless communication service when the wireless device 120 determines that the user 110 is holding the wireless device 120. Alternately or additionally, the wireless device 120 may adjust the power levels of the radio signals 122 below or above the power levels suggested by the wireless communication service based on other factors when the wireless device 120 determines that the user 110 is not holding the wireless device 120.

Reducing a power level of radio signals 122 emitted by the wireless device 120 when the user 110 is holding the wireless device 120 may allow the wireless device 120 to reduce the amount of radio signals 122 that may be absorbed by the user 110 holding the wireless device 120. Furthermore, reducing the power level of the radio signals 122 emitted by the wireless device 120 when the user 110 is holding the wireless device 120 may increase the ability of the wireless device 120 to comply with certain standards or regulations, such as specific absorption rate (SAR) compliance standards mandated by the Federal Communications Commission (FCC) of the United States and other global regulatory agencies.

Modifications, additions, or omissions may be made to the system 100 without departing from the scope of the present disclosure. For example, in some embodiments, the wireless device 120 may be provided wireless communication services from multiple access points, including the access point 130. In these and other embodiments, each of the access points may provide a different form of wireless communication services. For example, one of the access points may provide cellular LTE communication services and another access point may provide Bluetooth communication services. In these and other embodiments, the wireless device 120 may adjust the power level of radio signals transmitted to one or more of the access points but not others of the access points.

Figure 2:
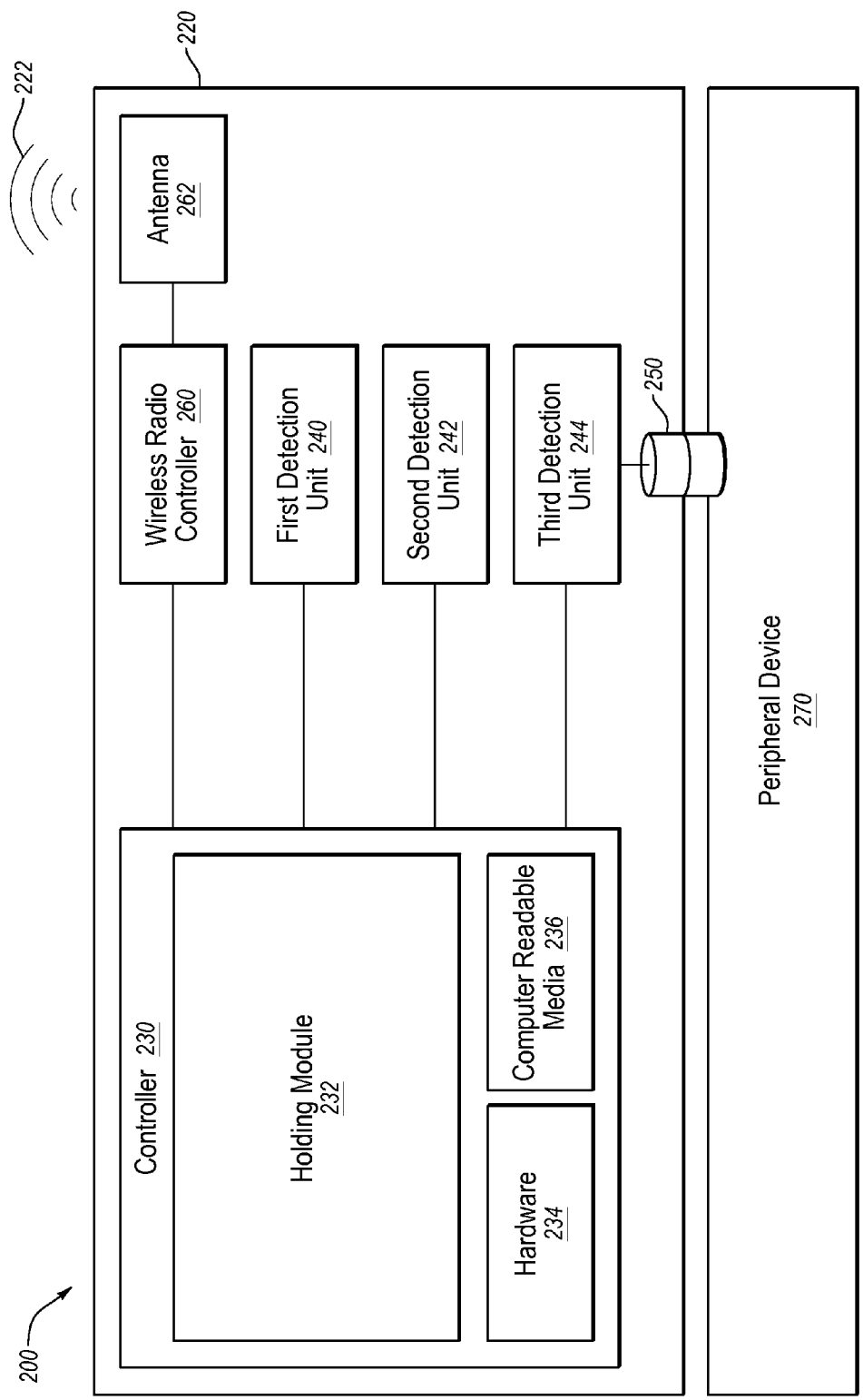
FIG. 2 is a block diagram of an example system that includes a wireless device.

FIG. 2 is a block diagram of an example system 200 that includes a wireless device 220, arranged in accordance with at least one embodiment described herein. The wireless device 220 may be an example embodiment of the wireless device 120 of FIG. 1. The wireless device 220 includes a controller 230, first, second, and third detection units 240, 242, and 244, a wireless radio controller 260, and an antenna 262. The system 200 also includes a peripheral device 270 coupled to the wireless device 220. In particular, the peripheral device 270 is coupled to a port 250 of the wireless device 220.

The first, second, and third detection units 240, 242, and 244 may each be configured to generate a signal based on detecting an indicator of a user holding the wireless device 220. In some embodiments, each of the first, second, and third detection units 240, 242, and 244 may generate a signal based on detecting a different indicator of a user holding the wireless device 220. In some embodiments, one or more of the first, second, and third detection units 240, 242, and 244 may generate more than one signal based on detecting more than one indicators of a user holding the wireless device 220. The generated signals may be sent to the controller 230.

In some embodiments, the first detection unit 240 may be a proximity sensor. In these and other embodiments, the first detection unit 240 may generate a signal based on an object being proximate to the wireless device 220. The object being proximate to the wireless device 220 may be an indicator of a user holding the wireless device 220. For example, the object could be a part of the user, such as a hand, leg, arm, and/or other part of a user holding the wireless device 220. In some embodiments, the first detection unit 240 may be proximate to the antenna 262. In these and other embodiments, the first detection unit 240 may generate a signal based on an object be proximate to a location of the antenna 262 in the wireless device 220.

In some embodiments, the second detection unit 242 may be a movement sensor. In these and other embodiments, the second detection unit 242 may generate a signal based on movement of the wireless device 220. The movement of the wireless device 220 may be an indicator of a user holding the wireless device 220 insofar as when a user holds the wireless device 220, the user may cause movement of the wireless device 220. For example, a user holding the wireless device 220 by holding the wireless device 220 in the user's hands may result in movement of the wireless device 220 due to the typical inability of a user to keep a portion of their body motionless. The movement of the wireless device 220 may be small, but the movement may be more than when the wireless device 220 is supported by a table or stand. When the second detection unit 242 detects movement of the wireless device 220, the second detection unit 242 may be configured to generate a signal to send to the controller 230 indicating the detected movement.

In some embodiments, the third detection unit 244 may be a sensor associated with the port 250. In particular, the third detection unit 244 may be a sensor configured to determine when an object, such as the peripheral device 270, is coupled to the wireless device 220 through the port 250. In these and other embodiments, the third detection unit 244 may generate a signal based on the peripheral device 270 being or not being coupled to the port 250. The peripheral device 270 being or not being coupled to the port may be an indicator of a user holding the wireless device 220. For example, the peripheral device 270 may be a keyboard, a docking station, a mouse, a port replicator, or some other peripheral that may be coupled to the wireless device 220. When the peripheral device 270, e.g., a keyboard, is coupled to the wireless device 220, the wireless device 220 may be more likely to be supported by an object than by a user. Thus, the wireless device 220 not being coupled to the peripheral device 270 may be an indicator of a user holding the wireless device 220. The third detection unit 244 may send the generated signal to the controller 230.

Furthermore, in some embodiments, the wireless device 220 may be configured to adjust the power level of radio signals 222 when a user is holding the wireless device 220 proximate the antenna 262. In these and other embodiments, a user holding the wireless device in a manner so that the user is not proximate the antenna 262 may not result in the wireless device adjusting the power level of the radio signals 222. In these and other embodiments, the location of the port 250 in relation to the antenna 262 may contribute to the peripheral device 270 being or not being coupled to the port 250 as an indicator of a user holding the wireless device 220. The port 250 and the antenna 262 may be positioned in the wireless device 220 in such a manner so that a user of the wireless device 220, when a peripheral device 270 is coupled to the port 250, would be unlikely to hold the wireless device 220 proximate to the antenna 262. Thus, the peripheral device 270 being coupled or uncoupled to the port 250 may be an indicator of a user holding the wireless device 220.

The controller 230 may include a holding module 232, hardware 234, and non-transitory computer readable media 236. The holding module 232 may be configured to receive the generated signals from the first, second, and third detection units 240, 242, and 244 and to determine whether a user is holding the wireless device 220 based on the received generated signals. Alternately or additionally, in some embodiments, the holding module 232 may determine whether a user is holding the wireless device 220 based on a generated signal from one or two, but not all, of the first, second, and third detection units 240, 242, and 244.

In some embodiments, the holding module 232 may determine whether a user is holding the wireless device 220 based on the signal from the second detection unit 242. In these and other embodiments, the signal from the second detection unit 242 may indicate movement of the wireless device 220. The holding module 232 may determine that a user is holding the mobile device when the movement of the wireless device 220 indicates that a user is holding the wireless device 220. In some embodiments, movement that indicates that a user is holding the wireless device 220 may be semi-continuous or continuous movement akin to movements of a hand or hands of a user that may be holding, e.g., holding, the wireless device 220. In these and other embodiments, a single abrupt movement or no movement may indicate that a user is not holding the wireless device 220.

In some embodiments, the holding module 232 may determine whether a user is holding the wireless device based on the signal from the third detection unit 244. In these and other embodiments, the signal from the third detection unit 244 may indicate whether an object is coupled to the wireless device 220. An object, such as the peripheral device 270, being coupled to the wireless device 220 may indicate that the wireless device 220 is not being held by a user because the peripheral device 270 being coupled to the wireless device 220 may cause the combination of the wireless device 220 and peripheral device 270 to be ill-suited for holding by a user. For example, when the peripheral device 270, such as a keyboard, is coupled to the wireless device 220, a user may not be holding the wireless device 220, e.g., the user may not be holding the wireless device 220, but may be interacting with the wireless device 220 through the peripheral device 270.

In some embodiments, the holding module 232 may determine whether a user is holding the wireless device 220 based on the signal from the first detection unit 240 and the signal from the second detection unit 242 and/or the third detection unit 244. In these and other embodiments, the holding module 232 may look at the signal from the first detection unit 240. When the signal from the first detection unit 240 indicates that an object is proximate to the wireless device 220, the holding module 232 may then consider signals from the second detection unit 242 and/or the third detection unit 244 to determine when a user is holding the wireless device 220. In some embodiments, when all of the signals from the first, second, and third detection units 240, 242, and 244 indicate that a user is holding the wireless device 220, the holding module 232 may determine that a user is holding the wireless device 220.

Alternately or additionally, the holding module 232 may determine that a user is holding the wireless device 220 based on a majority or only one of the signals from the first, second, and third detection units 240, 242, and 244 indicating a user is holding the wireless device 220.

By considering signals from multiple of the first, second, and third detection units 240, 242, and 244, the holding module 232 may more accurately determine when a user is holding the wireless device 220 than by using a signal from a single one of the first, second, and third detection units 240, 242, and 244. In particular, by considering signals from multiple of the first, second, and third detection units 240, 242, and 244 the holding module 232 may more accurately determine when a user is holding the wireless device 220 resulting in the user absorbing unacceptable or undesirable amounts of radio signals 222 transmitted by the antenna 262 of the wireless device 220 unless the power level of the radio signals 222 are adjusted.

After the holding module 232 determines that a user is holding the wireless device 220, the holding module 232 may indicate to the wireless radio controller 260 to adjust the power level of the radio signals 222 transmitted by the antenna 262. In particular, the holding module 232 may indicate to the wireless radio controller 260 to reduce the power level of the radio signals 222 transmitted by the antenna 262. In some embodiments, the holding module 232 may generate a power adjust signal and may send the power adjust signal to the wireless radio controller 260 to indicate to the wireless radio controller 260 to adjust the power level of the radio signals 222.

In some embodiments, after the holding module 232 determines that a user is holding the wireless device 220, the holding module 232 may continue to monitor the signals from the first, second, and third detection units 240, 242, and 244. When the holding module 232 determines from the signals that the user is no longer holding the wireless device 220, the holding module 232 may indicate such to the wireless radio controller 260. The wireless radio controller 260 may adjust the power level of the radio signals 222 by increasing the power level of the radio signals 222.

In some embodiments, the holding module 232 may be implemented using computer-readable media 236 for carrying or having computer-executable instructions or data structures stored thereon. Such computer-readable media 236 may be any available media that may be accessed by a general purpose or special purpose computer. By way of example, and not limitation, such computer-readable media may include tangible and/or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of the computer-readable media 236. Computer-executable instructions may include, for example, instructions and data that cause a general-purpose computer, special purpose computer, or special purpose-processing device (e.g., one or more processors) to perform a certain function or group of functions.

In these and other embodiments, the actions performed as described herein by the holding module 232 may be a result of computer executable instructions in the computer-readable media 236 being executed by the hardware 234. The hardware 234 may be a processor, a microprocessor, a field programmable gate array (FPGA), an application specific integrated circuit (ASIC) or some other hardware.

The wireless radio controller 260 may be configured to adjust the power level of the radio signals 222 based on the indication (e.g., the power adjust signal) from the holding module 232. The wireless radio controller 260 may be any type of wireless radio controller 260 that may be configured to receive and implement instructions regarding adjusting a power level of the radio signals 222 transmitted by the antenna 262.

An example of the holding module 232 determining whether a user is holding the wireless device 220 is as follows. Assume that the first detection unit 240 indicates that an object is proximate the wireless device 220 and, in particular, proximate to the antenna 262 of the wireless device 220. The object may be a table or desk or the object may be a user or part of a user, such as a hand, arm, and/or leg of a user. However, the holding module 232 may be unable to distinguish between a table supporting the wireless device 220 and a user holding the wireless device 220 based on the signal from the first detection unit 240.

To determine whether a user is holding the wireless device 220, the holding module 232 may also consider the signal from the second detection unit 242. The signal from the second detection unit 242 may indicate minimal or no movement of the wireless device 220, indicating that the wireless device 220 is supported by the table or desk. The holding module 232 may then determine that the wireless device 220 is placed on a desk or is otherwise supported by an object other than a user and is not being held by a user.

Alternately, the signal from the second detection unit 242 may indicate semi-continuous movement, continuous movement, or other movement of the wireless device 220. The semi-continuous movement, continuous movement, or other movement of the wireless device 220 may indicate that the wireless device is being held by a user. The holding module 232 may then determine that the wireless device 220 is being held by a user.

Alternately, after the holding module 232 determines that the signal from the second detection unit 242 indicates semi-continuous movement, continuous movement, or other movement of the wireless device 220, the holding module 232 may review a third signal, such as another signal from the second detection unit 242 or a signal from the third detection unit 244. Based on the third signal indicating that a user is holding the wireless device 220, the holding module 232 may determine that the wireless device 220 is being held by a user.

When the holding module 232 determines that the wireless device 220 is being held by a user, the holding module 232 may send a power adjust signal to the wireless radio controller 260. The wireless radio controller 260 may reduce the power level of the radio signals 222 transmitted by the antenna 262.

By reducing the power level of the radio signals 222 when a user is holding the wireless device 220, the amount of the radio signals 222 absorbed by the user may be reduced. If the wireless device 220 is not being held by a user, the power level of the radio signals 222 may be maintained.

Modifications, additions, or omissions may be made to the system 200 without departing from the scope of the present disclosure. For example, in some embodiments, wireless device 220 may not include one or more of the first, second, and third detection units 240, 242, and 244. Alternately or additionally, the wireless device 220 may include one or more additional detection units each configured to provide another signal to the controller 230 based on another indication that a user is holding the wireless device 220.

Alternately or additionally, the wireless device 220 may be configured to perform additional actions based on the signals from the first, second, and third detection units 240, 242, and 244. For example, the wireless device 220 may wake-up from sleep mode or increase the brightness of the display based on the signals from the first, second, and third detection units 240, 242, and 244.

Furthermore, while FIG. 2 illustrates a single antenna 262 and a single wireless radio controller 260, the present disclosure applies to a wireless device 220 having one or more antennas and wireless radio controllers. In these and other embodiments, the controller 230 may be configured to communicate with each of the wireless radio controllers to reduce power levels of radio signals broadcast by the antennas of the wireless device 220.

Alternately or additionally, the wireless device 220 of FIG. 2 illustrates the first, second, and third detection units 240, 242, and 244, the wireless radio controller 260, and the controller 230, and the antenna 262 being separate components. However, one or more of these components may be combined in a single component. For example, the controller 230 may be combined with the wireless radio controller 260 in a component that provides the functionality of the controller 230 and the wireless radio controller 260 described herein.

Additionally, note that the positioning of the first, second, and third detection units 240, 242, and 244 within the wireless device 220 is not limiting. FIG. 2 is provided to merely illustrate the wireless device 220 including the first, second, and third detection units 240, 242, and 244. The first, second, and third detection units 240, 242, and 244 may be positioned in various locations within the wireless device 220 based on numerous factors, such as a layout of the wireless device 220, sensitivity of the first, second, and third detection units 240, 242, and 244, what the first, second, and third detection units 240, 242, and 244 are configured to detect, among other things.

Figure 3:
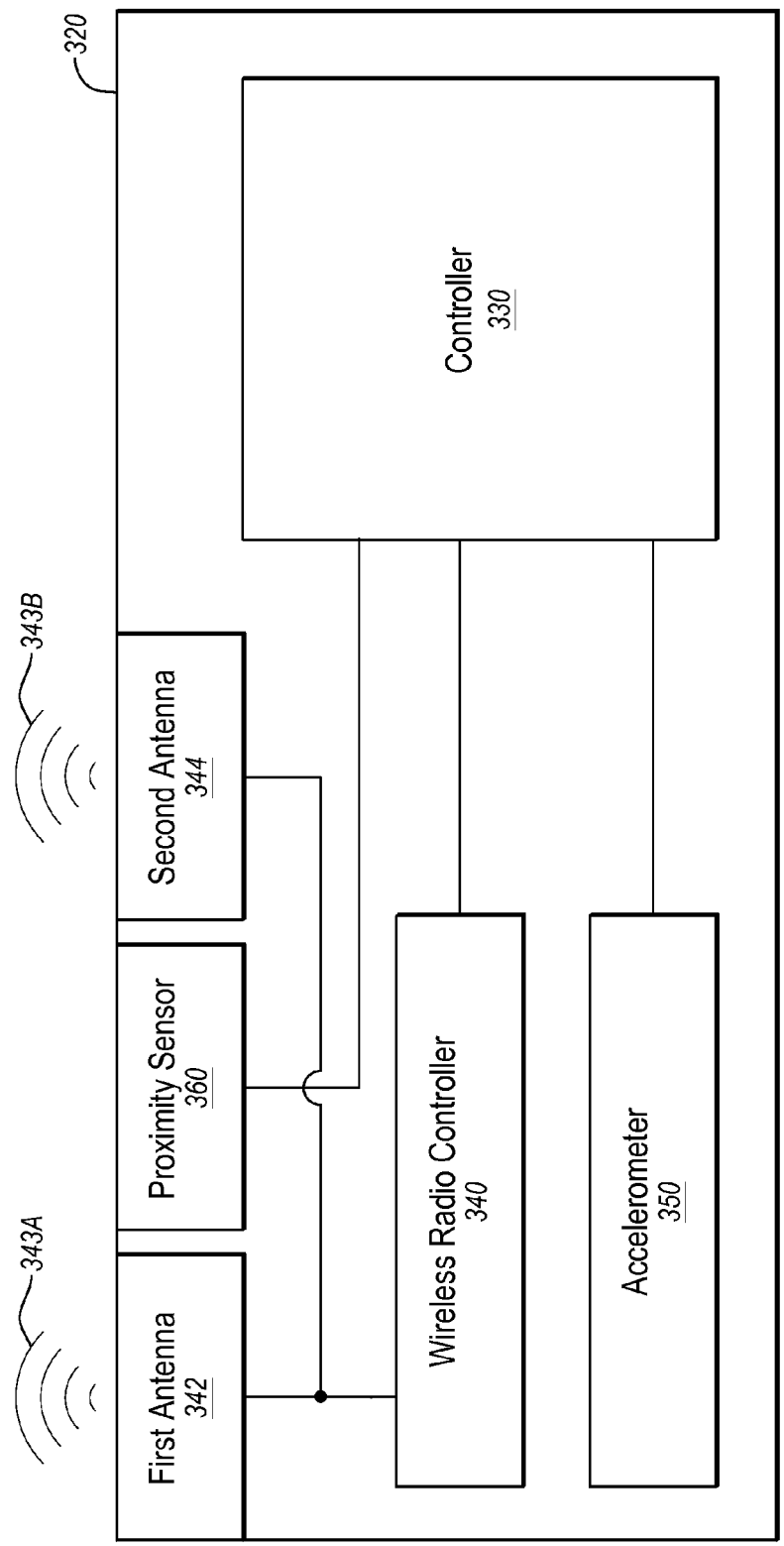
FIG. 3 is a block diagram of an example wireless device.

FIG. 3 is an example wireless device 320, arranged in accordance with at least one embodiment described herein. Either or both of the wireless devices 120 and 220 of FIGS. 1 and 2 may be configured as illustrated with respect to the wireless device 320. The wireless device 320 may include a controller 330, a wireless radio controller 340, a first antenna 342, a second antenna 344, an accelerometer 350, and a proximity sensor 360.

The first antenna 342 may be configured to transmit a first radio signal 343A. The second antenna 344 may be configured to transmit a second radio signal 343B. The first and second radio signals 343A and 343B may be referred to herein as the radio signals 343. The power level of the radio signals 343 may be adjusted by the wireless radio controller 340. In particular, the wireless radio controller 340 may be configured to adjust the power levels of the radio signals 343 by increasing or decreasing the power levels of the radio signal 343. The power levels of the radio signals 343 of the first and second antenna 342 and 344 may be adjusted in tandem or independently.

The accelerometer 350 may be configured to provide a movement signal and an inclination signal to the controller 330. The movement signal may provide an indication of movement of the wireless device 320. The inclination signal may provide an indication of inclination of the wireless device 320.

The proximity sensor 360 may be configured to provide a proximity signal to the controller 330. The proximity signal may provide an indication of an object being proximate to the wireless device 320. The proximity sensor 360 may be positioned adjacent to the first and second antennas 342 and 344 as illustrated in FIG. 3. In these and other embodiments, positioning the proximity sensor 360 adjacent to the first and second antennas 342 and 344 allows the proximity signal to indicate the proximity of an object to the first and second antennas 342 and 344 in the wireless device 320. Alternately or additionally, the proximity sensor 360 may be positioned anywhere within the wireless device 320.

The controller 330 may be configured to determine whether a user is holding the wireless device 320 based on one or more of the proximity signal, the movement signal, and the inclination signal.

In some embodiments, the controller 330 may consider the proximity, the movement, and the inclination signals in any order to determine whether a user is holding the wireless device 320. Alternately or additionally, the controller 330 may consider one of the proximity, the movement, and the inclination signals and once the considered one of the proximity, the movement, and the inclination signals indicates that a user is holding the wireless device 320, the controller 330 may consider others of the proximity, the movement, and the inclination signals.

For example, the controller 330 may first consider the proximity signal from the proximity sensor 360. When the proximity signal indicates that no object is proximate the wireless device 320, the controller 330 may take no further action. The controller 330 may continue to monitor the proximity signal until the proximity signal indicates that a user is proximate to the wireless device 320.

After the proximity signal indicates that a user is proximate to the wireless device 320, the controller 330 may consider the movement signal from the accelerometer 350. In some embodiments, the movement signal from the accelerometer 350 may be one or more signals from the accelerometer 350. For example, the movement signal may include x, y, and/or z, signals from the accelerometer 350. The controller 330 may analyze the movement signal to determine whether the wireless device 320 is moving consistent with a user holding the wireless device 320. For example, the movement consistent with a user holding the wireless device 320 may include each of the x, y, and z signals from the accelerometer 350 having values that are semi-continuously changing or continuously changing. In particular, the x, y, and z, signals from the accelerometer 350 may each have values that are semi-continuously changing or continuously changing within a range. The range of the values may be dependent on the inclination of the wireless device 320, the type of the wireless device 320, among other factors. In some embodiments, the controller 330 may analyze the movement signal in light of the inclination signal. As noted, a value of the movement signal when a user is holding the wireless device 320 may change based on the inclination of the wireless device 320. In these and other embodiments, the controller 330 may determine that the movement signal is consistent with a user holding the wireless device 320 when the movement signal is within a range appropriate for the inclination indicated by the inclination signal.

In one non-limiting example for one type of wireless device 320, the x, y, and z signals from the accelerometer 350 may have values of −0.01, −0.04, and −1.08, respectively, when the wireless device 320 is resting on a table. In contrast, the x, y, and z signals from the accelerometer 350 may have values ranging between 0.5 and 0.7, −0.62 and −0.67, and −0.85 and −0.87, respectively, when the wireless device 320 is being held by a user at approximately 45 degrees. At other inclinations, the value of the x, y, and z signals may change. These values are provided by way of example only and are not limiting in any way.

Figure 4A:
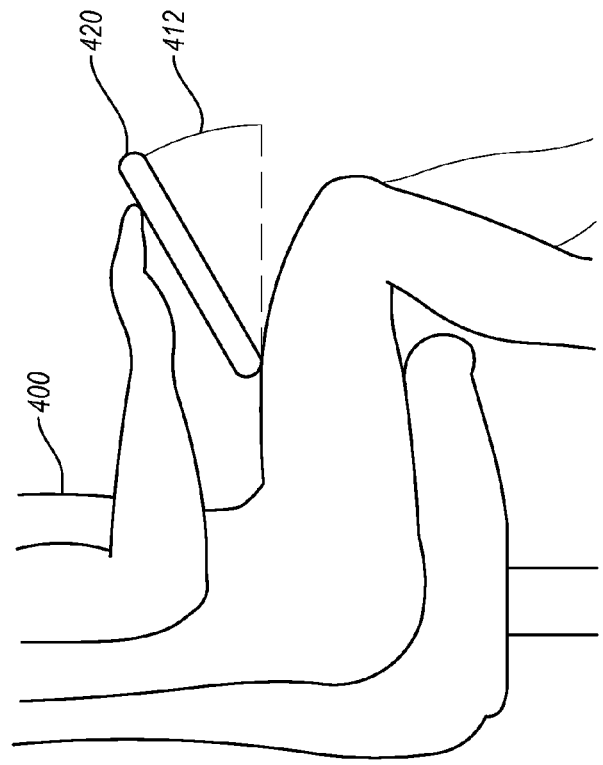
FIGS. 4A and 4B illustrate a user holding a wireless device.
Figure 4B:
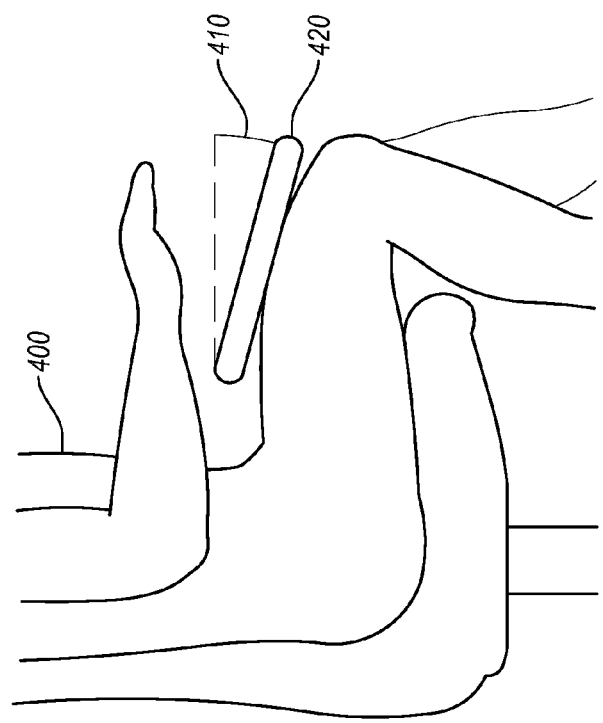

When the movement signal indicates that the user is not holding the wireless device 320, the controller 330 may take no further action. The controller 330 may continue to monitor the movement signal until the movement signal indicates that a user is holding the wireless device 320. After the movement signal indicates that a user is holding the wireless device 320, the controller 330 may consider the inclination signal from the accelerometer 350. The inclination signal may indicate the inclination of the wireless device 320. Certain inclinations may be more consistent with a user holding the wireless device 320 than others. For example, the wireless device 320 may have a smaller non-zero inclination when the wireless device 320 is resting on the lap of a user as illustrated in FIG. 4A. Smaller non-zero inclinations may include inclinations between negative 30 degrees and positive 30 degrees that does not include zero. Alternately or additionally, smaller non-zero inclinations may include inclinations between negative 15 degrees and positive 15 degrees that does not include zero. As another example, the wireless device 320 may have an inclination typically between 20 and 45 degrees when the wireless device 320 is being held in the hands of a user as illustrated in FIG. 4B. In contrast, the wireless device 320 may have an inclination of zero when the wireless device 320 is resting on a table or an inclination of typically 70 degrees when the wireless device 320 is resting on a stand. When the inclination of the wireless device 320 indicates that a user is holding the wireless device 320, the controller 330 may determine that a user is holding the wireless device 320.

When the controller 330 determines that a user is holding the wireless device 320, the controller 330 may send a power adjust signal to the wireless radio controller 340. The wireless radio controller 340 may adjust (e.g., reduce) the power level of one or more of the radio signals 343.

After sending the power adjust signal to the wireless radio controller 340, the controller 330 may continue to monitor the proximity, the movement, and the inclination signals. When one or more of the proximity, the movement, and the inclination signals fails to indicate a user holding the wireless device 320, the controller 330 may determine that a user is not holding the wireless device 320 and may send another power adjust signal to the wireless radio controller 340 so that the power levels of the radio signals 343 is increased.

Modifications, additions, or omissions may be made to the wireless device 320 without departing from the scope of the present disclosure. For example, in some embodiments, the wireless device 320 may include a detection unit and a port. In these and other embodiments, the detection unit may provide a detection signal to the controller 330 that indicates whether a user is holding the wireless device 320. The controller 330 may use the detection signal from the detection unit when deciding whether a user is holding the wireless device 320.

Alternately or additionally, the controller 330 may determine that a user is holding the wireless device 320 despite one or more of the proximity, the movement, and the inclination signals indicating that a user is not holding the wireless device 320. For example, the controller 330 may determine that a user is holding the wireless device 320 despite the inclination signal indicating that a user is not holding the wireless device. For example, the amount of movement of the wireless device 320 indicated by the movement signal may aid the controller 330 in determining that a user is holding the wireless device 320 even though the inclination signal may indicate that a user is not holding the wireless device 320.

FIGS. 4A and 4B illustrate a user 400 holding a wireless device 420, arranged in accordance with at least one embodiment described herein. In particular, FIG. 4A illustrates the user 400 holding the wireless device 420 at a first angle of inclination 410 that is a negative angle of inclination less than 20 degrees. FIG. 4B illustrates the user 400 holding the wireless device 420 at a second angle of inclination 412 that has a positive angle of inclination between 20 and 45 degrees.

Figure 5:
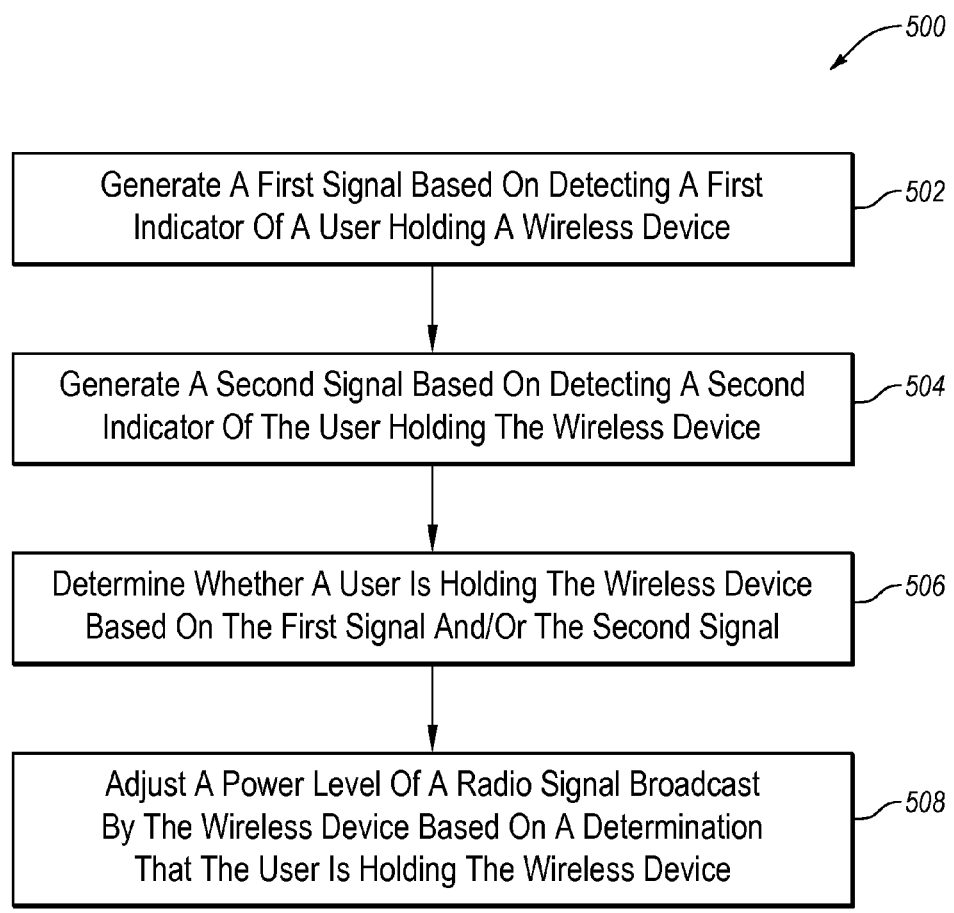
FIG. 5 is a flowchart of an example method of adjusting a power level of a radio signal of a wireless device.

FIG. 5 is a flowchart of an example method 500 of adjusting a power level of a radio signal, arranged in accordance with at least one embodiment described herein. The method 500 may be implemented, in some embodiments, by a wireless device, such as the wireless device 120, 220, 320, or 420 of FIGS. 1, 2, 3 and 4, respectively. Although illustrated as discrete blocks, various blocks may be divided into additional blocks, combined into fewer blocks, or eliminated, depending on the desired implementation.

The method 500 may begin at block 502, where a first signal may be generated based on detecting a first indicator of a user holding a wireless device. In some embodiments, the first indicator may be an object being proximate to the wireless device.

In block 504, a second signal may be generated based on detecting a second indicator of the user holding the wireless device. In some embodiments, the second indicator may be movement of the wireless device.

In block 506, whether a user is holding the wireless device may be determined based on the first signal and/or the second signal. In block 508, a power level of a radio signal broadcast by the wireless device may be adjusted based on a determination that the user is holding the wireless device. In some embodiments, adjusting the power level of the radio signal broadcast by the wireless device may include reducing the power level of the radio signal.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 500 may further include generating a third signal based on detecting a third indicator of the user holding the wireless device. In these and other embodiments, the determining whether the user is holding the wireless device may be based on the first signal, the second signal, and the third signal. In some embodiments, the third indicator may be the coupling of an object to the wireless device. Alternately or additionally, the third indicator may be the inclination of the wireless device.

As another example, the method 500 may further include increasing the power level of the radio signal broadcast by the wireless device based on a determination that the user is not holding the wireless device after the power level of the radio signal has been reduced.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of a computing system. In some embodiments, the different components, modules, engines, and services described herein may be implemented as objects or processes that execute on a computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A wireless device comprising:
    a first detection unit configured to detect movement of the wireless device and to generate a first value based on the movement of the wireless device;
    a second detection unit configured to detect an inclination of the wireless device;
    a controller configured to determine whether a user is holding the wireless device based on determining that the first value is within a particular range, the particular range determined based on the detected inclination, the controller further configured to generate a power adjust signal based on the determination that the user is holding the wireless device; and
    a wireless radio controller configured to adjust a power level of a radio signal broadcast by the wireless device based on the power adjust signal.

2. The wireless device of claim 1, further comprising a third detection unit configured to generate a signal based on detecting an indicator of the user holding the wireless device, wherein the controller is further configured to determine whether the user is holding the wireless device based on the signal.

3. The wireless device of claim 2, wherein the indicator is an electrical coupling of an electronic device to the wireless device.

4. The wireless device of claim 1, wherein the first detection unit and the second detection unit are a single accelerometer.

5. The wireless device of claim 2, wherein the indicator is an object being proximate to the wireless device.

6. The wireless device of claim 5, wherein the third detection unit is a proximity sensor.

7. A method of adjusting a power level of a radio signal, the method comprising:
    generating a first signal based on detecting an object being proximate to a wireless device;
    in response to detecting the object being proximate to the wireless device, detecting continuous or semi-continuous movement of the wireless device;
    in response to detecting movement of the wireless device, detecting an inclination of the wireless device;
    determining whether a user is holding the wireless device based on the first signal, the movement of the wireless device, and the inclination of the wireless device; and
    adjusting a power level of a radio signal broadcast by the wireless device based on a determination that the user is holding the wireless device.

8. The method of claim 7, wherein the adjusting the power level of the radio signal broadcast by the wireless device includes reducing the power level of the radio signal.

9. The method of claim 8, further comprising, after reducing the power level of the radio signal, increasing the power level of the radio signal broadcast by the wireless device based on the determination that the user is not holding the wireless device.

10. The method of claim 7, further comprising generating a fourth signal based on an electronic device being electrically coupled to the wireless device, wherein the determining whether the user is holding the wireless device is further based on the fourth signal.

11. The method of claim 7, wherein the determining whether the user is holding the wireless device is further based on whether a value that represents the movement of the wireless device is within a particular range, the particular range determined based on the inclination of the wireless device.

12. The method of claim 11, further comprising generating a fourth signal based on an electronic device being electrically coupled to the wireless device, wherein the determining whether the user is holding the wireless device is further based on the fourth signal.

* * * * *